(12) United States Patent
Johnson et al.

(10) Patent No.: US 7,831,807 B1
(45) Date of Patent: Nov. 9, 2010

(54) SYSTEM AND METHOD FOR EXPANDING THE INSTRUCTION SET OF AN INSTRUCTION PROCESSOR

(75) Inventors: David C. Johnson, Roseville, MN (US); Peter B. Criswell, Bethel, MN (US)

(73) Assignee: Unisys Corporation, BlueBell, PA (US)

( * ) Notice: Subject to any disclaimer, the term of this patent is extended or adjusted under 35 U.S.C. 154(b) by 778 days.

(21) Appl. No.: 10/176,841

(22) Filed: Jun. 20, 2002

(51) Int. Cl.
*G06F 9/30* (2006.01)
(52) U.S. Cl. .................................... 712/211
(58) Field of Classification Search .............. 712/227, 712/243, 211
See application file for complete search history.

(56) References Cited

U.S. PATENT DOCUMENTS

| | | | |
|---|---|---|---|
| 5,212,693 A * | 5/1993 | Chao et al. ................. | 714/5 |
| 5,619,408 A * | 4/1997 | Black et al. ................ | 712/226 |
| 5,790,843 A * | 8/1998 | Borkenhagen et al. ...... | 712/226 |
| 5,857,103 A * | 1/1999 | Grove ....................... | 717/158 |
| 6,279,096 B1 * | 8/2001 | McCoy et al. .............. | 711/211 |
| 6,317,822 B1 * | 11/2001 | Padwekar ................... | 712/209 |
| 6,965,984 B2 * | 11/2005 | Seal et al. ................... | 712/209 |

OTHER PUBLICATIONS

Henessy and Patterson. Computer Organization and Design, Morgan Kaufmann Publishers, Inc. 1998. pp. 391, 396, 383- 384, 145-146 and final page (unnumbered).*
The Authoritative Dictionary of IEEE Standards Terms, 7th ed. Standards Information Network IEEE Press, 2000. p. 765.*

* cited by examiner

*Primary Examiner*—Jacob Petranek
(74) *Attorney, Agent, or Firm*—James E. Goepel; Robert P. Marley

(57) ABSTRACT

A system and method for modifying the hardware instruction set of an instruction processor is disclosed. The invention utilizes one or more bits of an instruction opcode and one or more programmable bits stored within the instruction processor to generate a branch address. The branch address is then used to address a storage device such as a microcode RAM to retrieve one or more microcode instructions that control execution of the instruction opcode. Address generation is controlled by selecting a previously unused instruction opcode, then modifying the programmable bits as necessary to generate a desired branch address. By loading modified microcode instructions at the branch address, instruction execution can be modified without changing the hardware design.

55 Claims, 9 Drawing Sheets

SYSTEM AND METHOD FOR EXPANDING THE INSTRUCTION SET OF AN INSTRUCTION PROCESSOR

FIELD OF THE INVENTION

The current invention relates generally to controlling the execution of an instruction processor; and, more particularly, relates to an improved system and method for modifying the instruction set of an instruction processor.

BACKGROUND OF THE INVENTION

Instruction processors of the type known in the art have an instruction set that is primarily implemented in hardware circuitry and microcode instructions. After the design of the processor is embodied within a silicon device, the instruction set is not easily modified without changing the hardware design. That is, additional instructions cannot be readily added to the instruction set. Similarly, the way in which an existing instruction executes cannot be easily changed.

One straightforward way to add an instruction to the instruction set of the processor involves altering the hardware design. For example, decode circuitry within the instruction processor can be modified to decode a previously unused instruction operation code (opcode). This type of modification involves manufacturing a new version of a semiconductor device, which is time consuming and very expensive.

Another mechanism for implementing a less comprehensive change involves modifying microcode instructions. These instructions, which may be stored in one or more Random Access Memories (RAMs) within the instruction processor, are used in conjunction with signals generated in hardware to control the manner in which some, or all, of the instructions execute. To a limited extent, these microcode words can be programmably modified to change the way in which one or more instructions are executed. This could be done, for example, to address a problem that is discovered after the hardware design is completed.

Modifying the microcode stored within an instruction processor allows for design modification without requiring the fabrication of another version of the silicon device. However, this solution is often not viable. For example, it is common for a single set of microcode words to be used to control execution of a group of related instructions. It may be necessary to modify execution of only a single one of these related instructions. In this case, modifying the microcode words will not be possible, since such a modification would undesirably change execution of all other related instructions.

An alternative solution to those described above involves utilizing the operating system of the machine to recognize a newly defined instruction opcode. In most instruction processors, an interrupt is generated to the operating system when an undefined (invalid) instruction opcode is encountered. The operating system will generally recognize this as an error condition. If desired, one of these previously undefined opcodes may be selected to designate a newly defined or modified instruction. When an interrupt is generated to the operating system upon encountering this opcode, the operating system can be used to identify this opcode as a valid instruction. The operating system then emulates the newly defined instruction in software. That is, multiple software instructions are executed to emulate the functions that would otherwise be performed in hardware and/or microcode if the instruction opcode were part of the IP's instruction set.

While the foregoing solution does not require modifying the hardware design, it is relatively inefficient. Interrupt generation and subsequent instruction emulation may require hundreds, if not thousands, of instruction execution cycles to complete. If a frequently executed instruction is implemented in this manner, overall system performance can be significantly impacted by this overhead.

What is needed, therefore, is an improved system and method for making modifications to the hardware instruction set of an instruction processor.

SUMMARY OF THE INVENTION

The current invention provides a system and method for modifying the hardware instruction set of an instruction processor. The invention utilizes one or more bits of an instruction opcode and one or more programmable bits stored within the instruction processor to generate a branch address. The branch address is then used to address a storage device such as a microcode RAM to retrieve one or more microcode instructions that control execution of the instruction opcode. Address generation is controlled by selecting a previously unused instruction opcode, then modifying the programmable bits as necessary to generate a desired branch address. By loading modified microcode instructions at the branch address, instruction execution can be modified without changing the hardware design.

In one embodiment of the invention, the programmable bits are retrieved from a microcode RAM and are compared against one or more selected bits of the instruction opcode. The result of the comparison is used to determine which of two addresses will be selected to address the microcode RAM. The instruction opcode bits that are used to perform this comparison are selected using some of the programmable bits. For example, ones of the programmable bits may be decoded, then used to select one or more fields or subfields of the instruction opcode that will be used during the comparison. In another embodiment, a mask operation may be used to select the instruction opcode bits to be used in the comparison.

According to one aspect of the invention, an arithmetic logic unit (ALU) is used to perform a mask comparison. In this case, a masked compare operation is performed by the ALU to first mask the instruction opcode, then to compare the results of the mask operation to a compare value. The next microcode RAM address is generated based on the outcome of the comparison. In this embodiment, both the mask and the compare value may be provided as instruction operands. In an alternative embodiment, these values may be generated under control of the programmable bits retrieved from the microcode RAM, or provided directly from the microcode RAM or another storage device within the instruction processor.

In yet another embodiment of the invention, one or more of the instruction opcode bits may be used as one or more of the address bits of the generated microcode RAM address. For example, some of the opcode bits may be selected as the least significant address bits of the generated microcode RAM address.

According to one aspect of the invention, a method of controlling execution of an instruction processor is provided. The method includes selecting one or more bits of an instruction opcode, comparing the selected bits to a compare value, and generating, based on a result of the comparing step, an address for use in addressing a storage device within the instruction processor.

In another embodiment of the invention, a system for use in controlling the operation of an instruction processor is provided. The system includes a storage device, and an instruction branch circuit. The instruction branch circuit is coupled to receive data signals from the storage device, and to further receive one or more bits of an instruction opcode. The instruction branch circuit uses the data signals and the one or more bits of the instruction opcode to retrieve a microcode instruction. The microcode instruction is used to control execution of the instruction opcode.

According to another aspect of the invention, a method of controlling execution of an instruction processor is disclosed. The method includes reading data signals from a storage device of the instruction processor, wherein the data signals may be microcode bits read from a microcode RAM. One or more bits of an instruction opcode are then selected. The data signals and the selected bits of the instruction opcode are used to obtain a microcode instruction, which is then used to control operation of the instruction processor.

Other aspects and embodiments of the invention will become apparent from the following description and the accompanying drawings.

DETAILED DESCRIPTION OF THE PREFERRED EMBODIMENT

I. System Description

Figure 1:
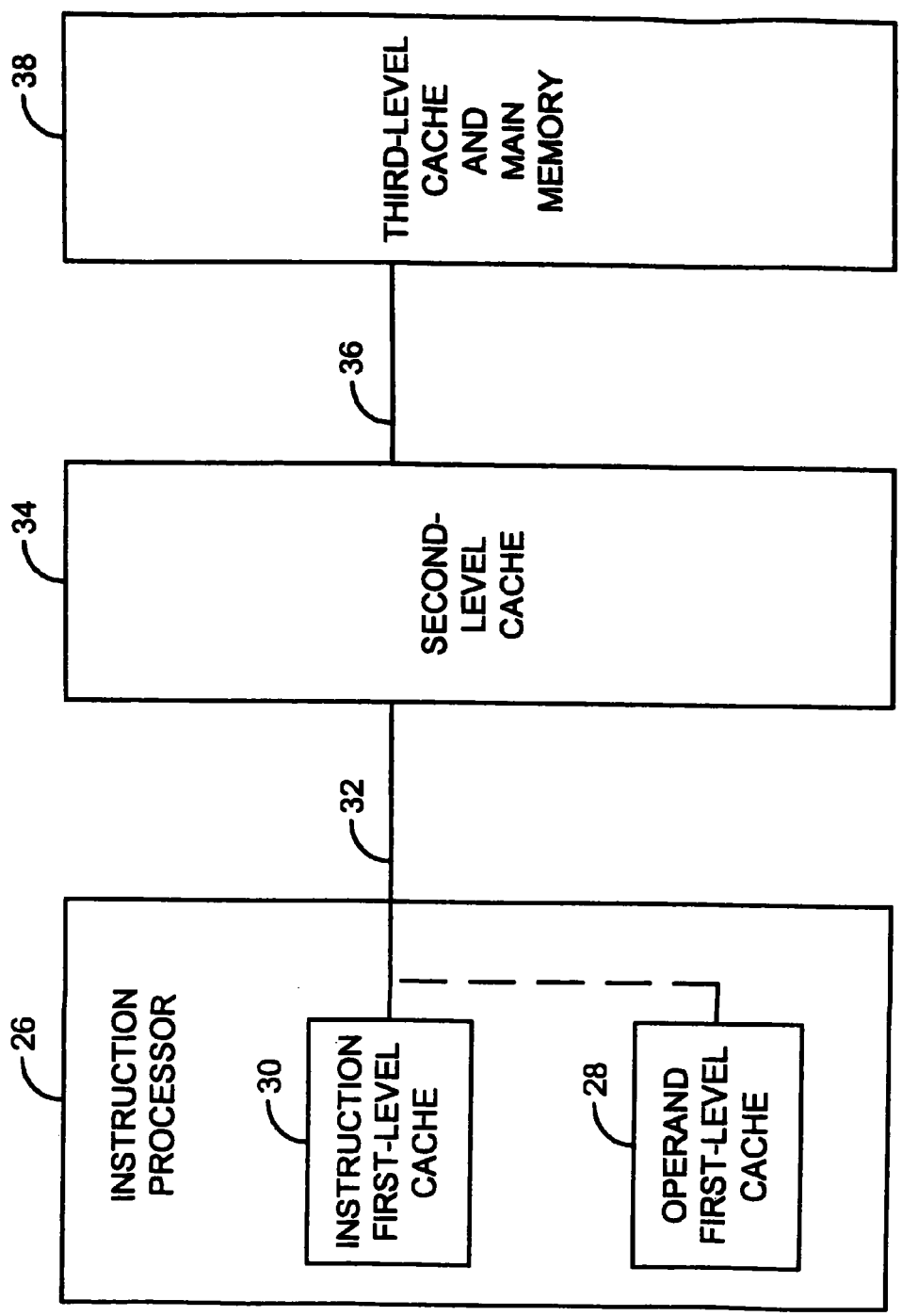
FIG. 1 is a schematic block diagram of an exemplary data processing system that may utilize the current invention.

FIG. 1 illustrates one embodiment of a system that may usefully employ the current invention. However, many other types of systems may utilize the current invention, as will become apparent to those skilled in the art from the following description and accompanying drawings.

The system of FIG. 1 includes an Instruction Processor (IP) 26 having both an Operand First-Level Cache (O-FLC) 28 and an Instruction First-Level Cache (I-FLC) 30. The O-FLC and I-FLC are relatively small, fast, memories for storing recently used operands and instructions, respectively to speed instruction execution within the IP as is known in the art.

I-FLC and O-FLC are coupled via Interface 32 to a Second-Level Cache (SLC) 34 storing both instructions and operands. Requests for instructions or operands are made to the SLC when the instructions or operands are not located within the I-FLC 30 or the O-FLC 28, respectively. Similarly, the SLC 34 is coupled via Memory Interface 36 to additional storage shown as Memory 38. When a request is made to the SLC for an item not stored in the SLC, the request is forwarded to Memory 38 for processing. In one embodiment, Memory 38 includes both a third-level cache and a main storage unit. The implementation details of Memory 38 are beyond the scope of this application.

Figure 2:
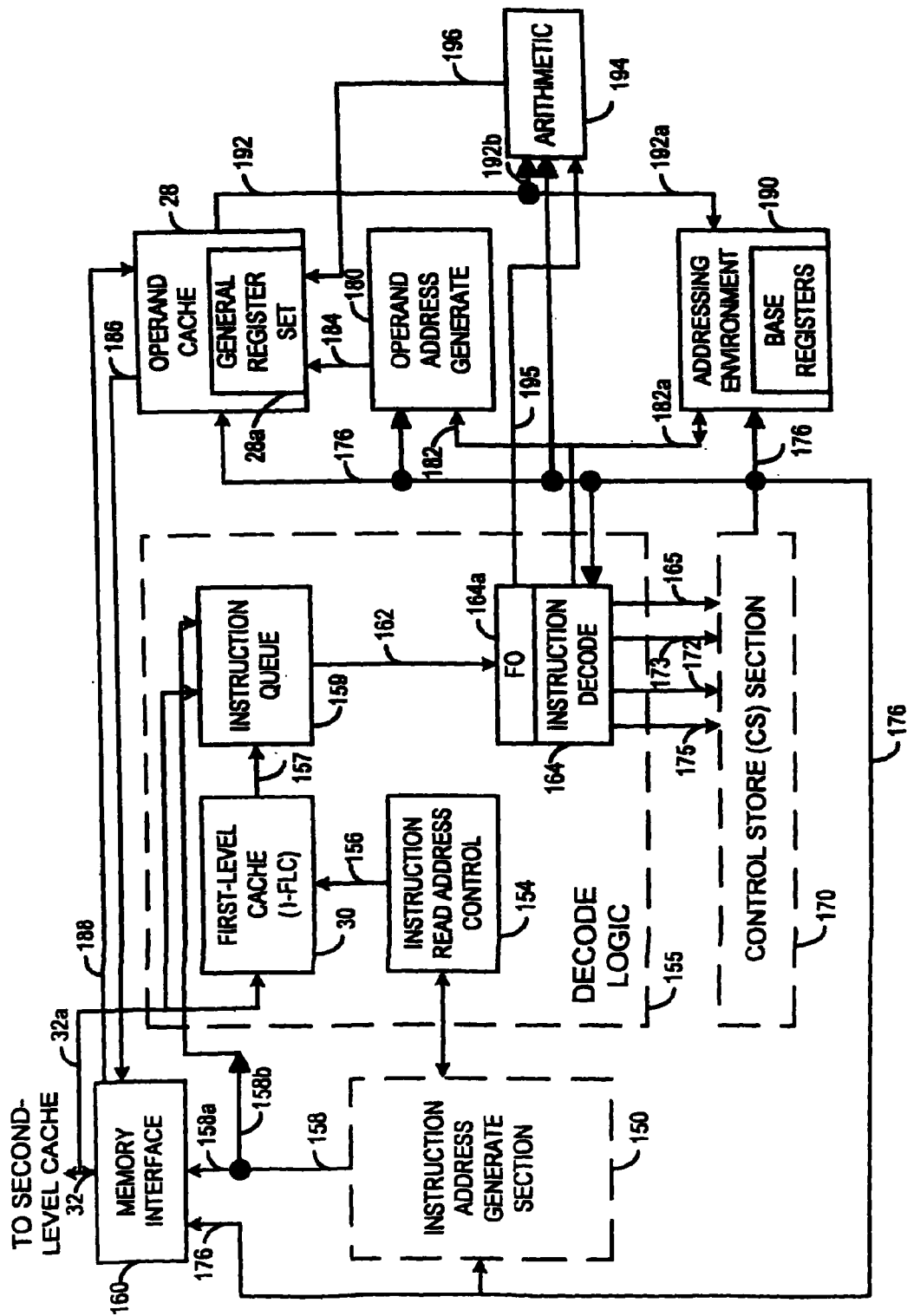
FIG. 2 is a schematic block diagram of an exemplary Instruction Processor that may utilize the current invention.

FIG. 2 is a block diagram of one embodiment of an Instruction Processor (IP) that may utilize the current invention. This embodiment will be understood to be exemplary only, and many other types of IP architectures may usefully employ the inventive system and method. The IP of the preferred embodiment includes an Instruction Address Generate section 150 that generates an absolute address used to retrieve an instruction. This address is provided via Instruction Read Address Control 154 to the IP Instruction First-Level Cache (I-FLC) 30 within Decode logic 155. If a cache miss does not occur, the addressed instructions are transferred to an instruction queue 159 over lines 157 to be staged so that decode may begin.

If a cache miss occurs, the IP suspends execution. Lines 158a communicate the miss to the IP Memory Interface 160, which initiates a memory request to the SLC 34 via interface 32. When the instruction is returned, it is provided on data path 32a to instruction queue 159 and to the I-FLC 30 to be cached.

Once in the instruction queue 159, the instruction is staged through a series of staging registers (not shown in FIG. 2), and instruction decode begins. Partially decoded instruction signals are provided on lines 162 to the Instruction Decode section 164, and the instruction opcode is loaded into an instruction register referred to as "F0 register" 164a. The instruction decode subsection 164, which contains both hardware and microcode decode logic, generates control signals to control the rest of the IP. These control signals include addresses provided over lines 182 to the Operand Address Generate section 180, which generates an operand absolute address that is provided to the Operand Cache (O-FLC) 28 so that an instruction operand may be retrieved.

After the absolute operand address has been received by the O-FLC 28, it is determined whether the addressed operand is resident in this cache. If the operand is not resident, the IP suspends instruction execution and initiates a memory read operation using a real address generated by the O-FLC 28. This real address is transferred over lines 186 to the Memory Interface 160, which then controls the memory request to the SLC 34 over Interface 32. After the operand is returned, it is provided to the O-FLC 28 on lines 188.

Operand data is made available over lines 192b to the arithmetic section 194 for use in performing binary, floating point, and decimal arithmetic operations. The results of these operations are stored back to a set of storage devices known as the General Register Set (GRS) 28a over lines 196.

According to one embodiment of the current invention, arithmetic section 194 may further receive the instruction opcode from the F0 register on lines 195. The use of the instruction opcode is discussed below in reference to FIGS. 6 and 7.

Also shown in FIG. 2 is Control Store (CS) section 170, which is a microcode-controlled sequencer. During execution of most "standard" instructions, CS logic does not exercise control over the other logic sections. Instead, control is provided by signals on lines 172 that are generated by Decode logic 155 and simply re-driven by CS section 170 onto lines 176. For other non-standard "extended mode" instructions, the CS section drives lines 176 to assert control over the other logic sections.

Figure 3A:
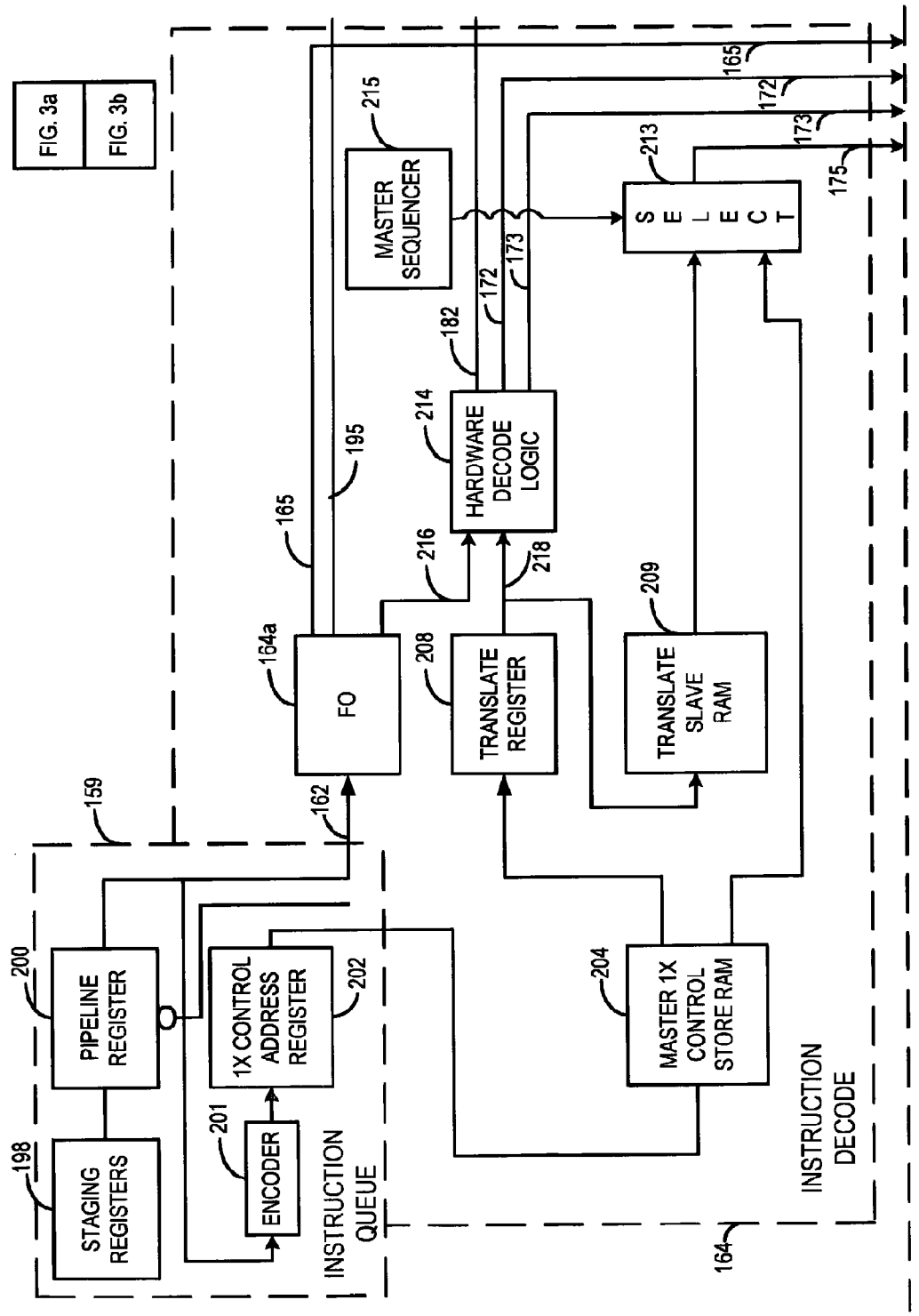
FIGS. 3A and 3B, when arranged as shown in FIG. 3, are a schematic block diagram of Decode logic and Main Control Store (CS) logic of an exemplary Instruction Processor as shown in FIG. 2.
Figures 3, 3B:
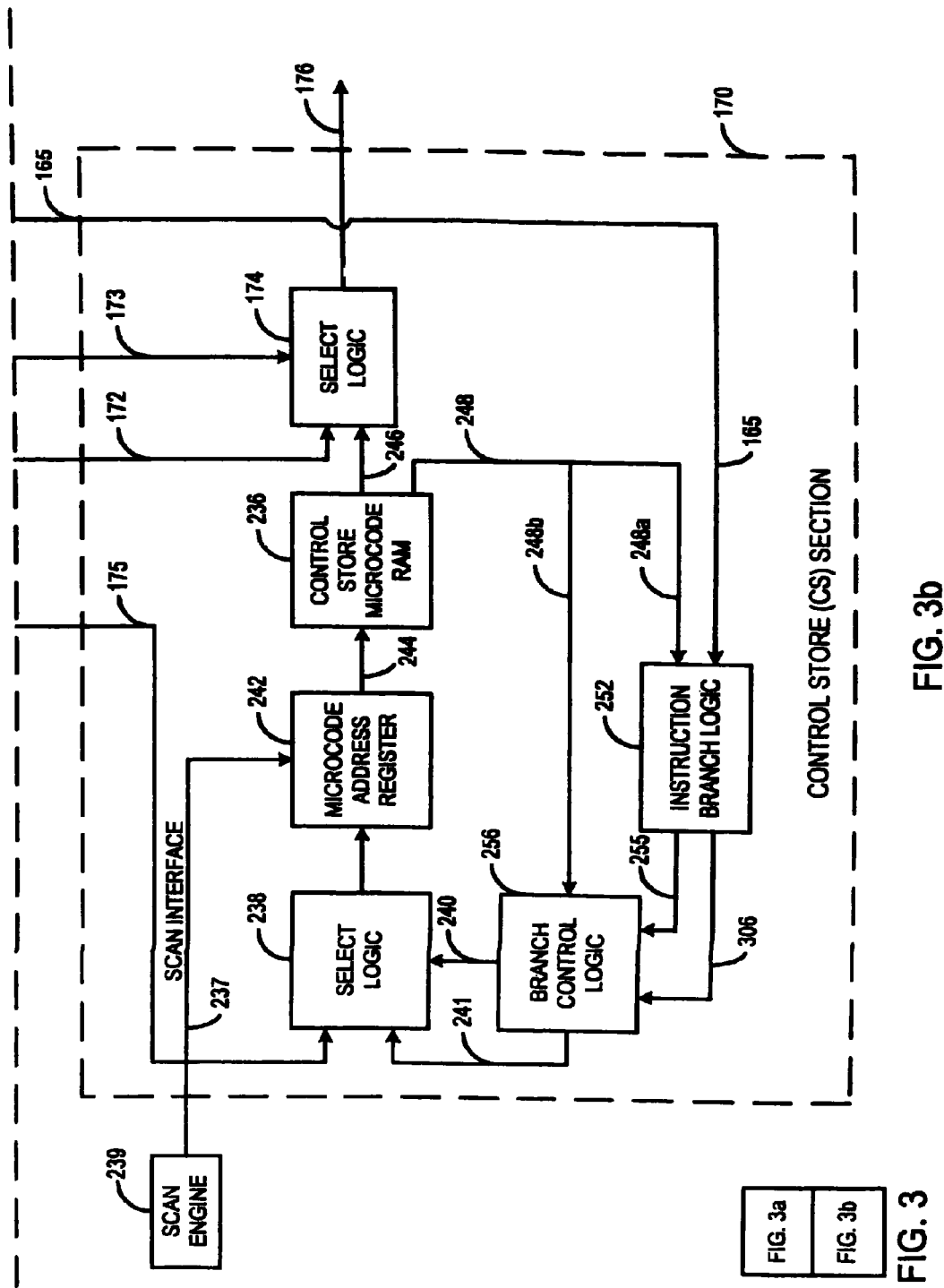

FIGS. 3A and 3B, when arranged as shown in FIG. 3, are a schematic diagram of a portion of decode logic 155 and CS section 170. During instruction execution, an instruction is read from staging registers 198 and latched within a pipeline register 200. A portion of the instruction latched within pipeline register 200 is encoded by encoder 201 and stored within 1× control address register 202. Data from 1× control address register 202 is provided to instruction decode subsection 164 as the address to the master 1× control store random access memory (CS RAM) 204.

The master 1×CS RAM 204 contains a unique set of control bits for each machine instruction in the instruction set. After a unique set of control bits is read from master 1×CS RAM 204 for a valid instruction, selected ones of these bits are provided to a translate register 208. In addition, the instruction opcode from pipeline register 200 is latched in instruction register, called the "F0" register 164a. The latched information from F0 register 164a and translate register 208 is then provided to the hardware decode logic 214, which generates pipeline control signals 172.

Hardware decode logic 214 does not exhaustively decode the instruction opcode. That is, there are some combinations of signals that may be provided on lines 216 that are not considered valid instructions. This partial decode of the instruction is performed to minimize the size of hardware decode logic 214, both to shorten the propagation delay through this logic, and to conserve silicon area on a semiconductor chip. When any of the invalid (unused) instruction combinations are presented to instruction decode logic 164, an interrupt is generated to the operating system. The handling of these invalid instructions will be discussed further below.

Pipeline control signals 172 generated by hardware decode logic 214 are provided to select logic 174 within CS section 170. Hardware decode logic 214 further generates a CS control signal 173 that is used to select pipeline control signals for propagation on lines 176 to the other logic sections of the IP, as is shown in FIG. 3B.

During all stages, or cycles, of instruction execution for "standard" mode instructions, the pipeline control signals 172 are provided to all sections of the IP logic to control the circuitry. Other "extended mode" instructions are executed, at least in part, using microcode stored within CS section 170 as follows. During the first stage of instruction execution for an extended mode instruction, control signals 172 generated by hardware decode logic 214 are selected by CS control signal 173 and provided on lines 176 in a manner similar to that discussed above. After the first stage of execution completes, the CS control signal 173 goes active so that control signals provided by a Control Store (CS) microcode RAM 236 are selected for propagation on lines 176. Multiple stages are executed under microcode control. Eventually, CS control signal 173 is cleared, allowing control signals 172 from hardware decode logic 214 to resume control of IP execution.

CS section 170 is a micro sequencer. In the current embodiment, the micro sequencer receives an initial address from master 1×CS RAM 204 on lines 175 based on timing signals generated by master sequencer 215. This initial address is stored within microcode address register 242, and is used to address CS microcode RAM 236.

CS microcode RAM is a relatively wide storage device that may be loaded via a scan interface 237 and scan engine 239 in a manner known in the art. When an address is presented to CS microcode RAM, data signals read from the RAM are provided on lines 246. These signals may be driven unto lines 176 by select logic 174 to control instruction execution during extended mode instruction execution. In addition to generating control signals 246 to control instruction execution, CS microcode RAM 236 provides address and control signals 248. These signals are provided on lines 248b to branch control logic 256 for use in obtaining the next address to be used to access CS microcode RAM 236. Specifically, address' and control signals 248 include a target address. If one or more predetermined state and/or error conditions are present within the IP during the current stage of instruction execution, this target address is used to generate the next CS microcode RAM address. Otherwise, the address is obtained by incrementing the current CS microcode RAM address. The particular state and/or error conditions to be used to make this decision are also specified by a subfield of address and control signals 248.

After an address is generated by branch control logic 256 in the manner discussed above, this address is presented on lines 241 to select logic 238. A signal on line 240 that is generated by branch control logic 256 then selects either the address on lines 241 or the address generated by instruction decode 164 on lines 175 for presentation to CS microcode RAM 236. In this manner, branch control logic 256 provides limited branching capability based on dynamic conditions arising within the IP during instruction execution.

The foregoing discussion describes the manner in which prior art systems utilize state and error conditions within the IP to provided limited microcode branching conditions. Generally, the state and error conditions may be any type of condition arising within the IP because of instruction execution. For example, it may be any signal generating during instruction execution that is provided to branch control logic 256 for the purpose of controlling microcode branching.

The current invention improves microcode branching capability by using the instruction opcode and programmable bits within CS microcode RAM 236 to selectably control microcode branching. This capability can be used to allow instructions to be added to the instruction set of the IP after the hardware design has been completed. This logic can also be used to generate "work-around" solutions to problems discovered after the IP design has been embodied in silicon.

II. Detailed Description of the Invention

As noted above, prior art IP designs do not readily allow for the addition or modification of instructions after the design has been embodied in silicon. In these systems, instruction decode circuitry such as hardware decode logic 214 is generally designed to decode only the instruction combinations that are in use at the time the design is developed. This minimizes the size of the decode circuitry to shorten propagation delays and to conserve silicon real estate. However, this also makes it difficult to add instructions to the machine instruction set after the hardware design is complete.

One straightforward way to add an instruction to the instruction set of the system involves altering the hardware design. For example, hardware decode logic 214 may be modified to utilize one of the unused instruction combinations. The new design can then be used to manufacture a new version of the original semiconductor chip. This solution is time consuming and very expensive.

An alternative solution to that described above involves utilizing the operating system of the machine to recognize an instruction code of a newly defined instruction. As noted above, an interrupt is generated to the operating system upon encountering an unused (invalid) instruction code. The operating system will generally recognize this as an error condition. The program stack entry that is generated by the IP logic at the time the interrupt occurred will store both the instruction code and other system information to allow the operating system to analyze the error. If desired, the operating system can decode the instruction code stored within this stack entry to identify the unused instruction. Once identified, the instruction can be emulated in software. That is, multiple software instructions may be executed by the IP to emulate the functions that would otherwise be performed in hardware and/or microcode if the instruction opcode were part of the IP's instruction set.

While the foregoing solution does not require modifying the hardware design, it is slow. Interrupt generation, instruction decode, and subsequent instruction emulation may require hundreds, if not thousands, of instruction execution cycles to complete. If a frequently executed instruction is implemented in this manner, overall system performance can be significantly impacted by this overhead.

The current invention provides a flexible mechanism that allows the instruction set of the instruction processor to be expanded after the initial design is completed. A newly added instruction can be executed within a time frame that is comparable to that required for other extended-mode instructions. Moreover, no hardware modifications are necessary.

Figure 4:
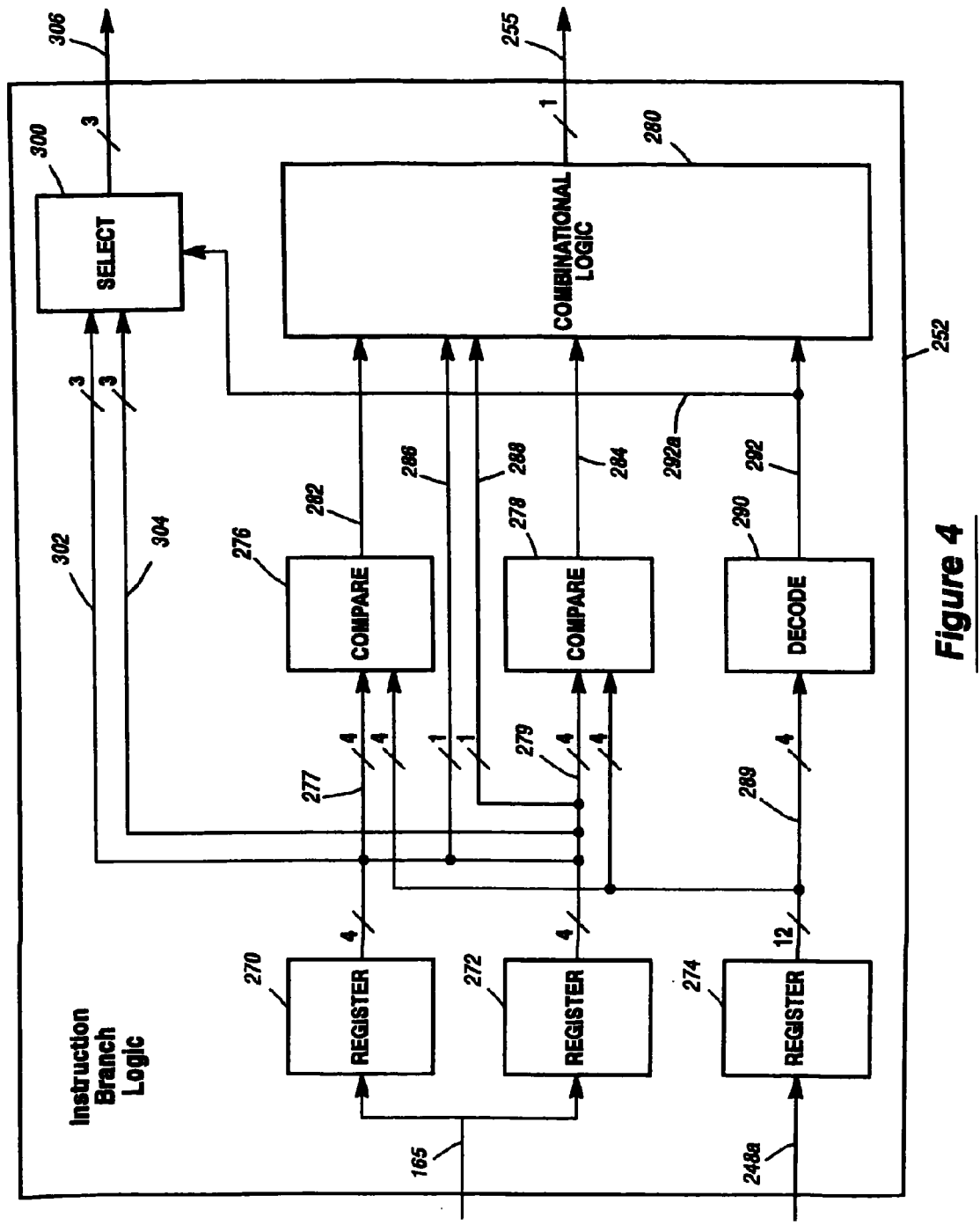
FIG. 4 is a schematic block diagram of the instruction branch logic of one embodiment of the current invention.

FIG. 4 is a system block diagram of instruction branch logic 252 of the current invention. As discussed above in reference to FIG. 3B, address and control signals 248 are provided by CS microcode RAM 236. A subset of these signals is provided to instruction branch logic 252 on lines 248a. Instruction branch logic 252 further receives a subset of the instruction opcode on lines 165 from F0 register 164a. Any subset of the instruction opcode may be provided on lines 165. In the current embodiment that is associated with a 2200™ instruction processor commercially available from the Unisys Corporation, eight bits of the instruction opcode are provided to instruction branch logic 252. These eight bits comprise two four-bit instruction fields commonly referred to as the "J" and the "A" fields. Typically, in 2200 instructions, the "J" field is used to identify the type of instruction being executed, and the "A" field is used to identify one or more registers within GRS 28a that will be used during instruction execution. Because these fields are not exhaustively decoded, unused encoded values exist that may be used to identify newly added instructions.

Each of the four-bit "J" and "A" fields are stored within registers 270 and 272, respectively. Additionally, address and control bits 248a, hereinafter referred to as "microcode test bits", are stored within register 274. "J" field signals stored within register 270 are provided to compare logic 276 on line 277 to be compared against a subset of the microcode test bits stored within register 274. Similarly, signals stored within register 272 are provided on line 279 to compare logic 278 to be compared against a different subset of the microcode test bits. In the current embodiment, the entire stored "J" and "A" field signals are provided to compare logic 276 and 278, respectively, although a subset of one or more of these fields could be compared against all, or a subset of the microcode test bits, if desired. Many different combinations are possible within the scope of the current invention.

The results of the two comparisons are provided to combinational logic 280 on lines 282 and 284. Additionally, combinational logic 280 receives the most significant bits of the "J" and "A" fields on lines 286 and 288. In another embodiment, one or more different bits from the "J" and "A" fields may be provided on lines 286 and 288.

Combinational logic 280 is used to generate a branch signal 255. This branch signal will be used by branch control logic 256 to generate a next address to be presented on lines 241 to select logic 238 in the manner described above. If branch signal is active and is selected for use by branch control logic 256 in a manner to be discussed below, the target address provided on lines 248b by CS microcode RAM 236 will be used to generate the next CS microcode RAM address. Otherwise, assuming no other predetermined branch conditions are active within the IP, the next CS microcode RAM address will be generated by incrementing the previous address. This is discussed further below in reference to FIG. 5.

Several conditions may be used to activate branch signal 255. For example, this signal may be activated if the significant bits of the "J" fields are equal to a subset of the microcode test bits. Alternatively, signal activation may occur if the "A" field, or both the "J" and "A" fields, are equal to respective subsets of the microcode test bits. In yet another scenario, branch signal 255 may be activated if a predetermined one of the signals on lines 286 and 288 are set to a predetermined value such as "one". The five exemplary branch conditions discussed above may be summarized as follows:

1.) "J" field, bits 0-3, =subset 1 of the test bits;
2.) "A" field, bits 0-3, =subset 2 of the test bits;
3.) Both "J" and "A" fields, bits 0-3, =subset 3 of the test bits;
4.) "J" field bit 0=1; and
5.) "A" field bit 0=1.

Yet another subset of the microcode test bits stored in register 274 are provided on line 289 to decode logic 290, and the decoded signals are provided to combinational logic 280 to be used to select a branch condition to be used in generating branch signal 255.

In addition to generating branch signal 255, instruction branch logic also generates a set of address signals on lines 306, which are driven by select logic 300. Select logic 300, under the control of one of the decoded signals 292a from decode logic 290, selects between the three least significant bits of the "J" field on lines 302, or the three least significant bits of the "A" field on lines 304. The selected three bits are provided on lines 306 and may be concatenated with the most significant portion of the branch address in a manner to be discussed further below.

Before continuing with a discussion of the various embodiments of invention, it may be noted that the system of FIG. 4 is merely exemplary in nature. For example, more or fewer bits, and/or more or fewer opcode fields, from the instruction opcode may be provided to instruction branch logic 252. Entirely different opcode fields may be used, if desired. Additionally, other combinations of branch conditions may be used to generate branch signal 255. For example, this signal may be generated if the "J" field is equal to the test bits AND the most significant bit of the "A" field is set. Other such combinations may be contemplated. In yet another embodiment, the bits and/or fields of the instruction opcode that are used to generate the branch condition may be selected using a mask value rather than using decode logic. A mask value could be stored within CS microcode RAM 236, for example, and used to perform a mask operation on the instruction opcode so that selected bits of the opcode are retained for use in generating the Branch address. An example of this type of embodiment is discussed below.

Figure 5:
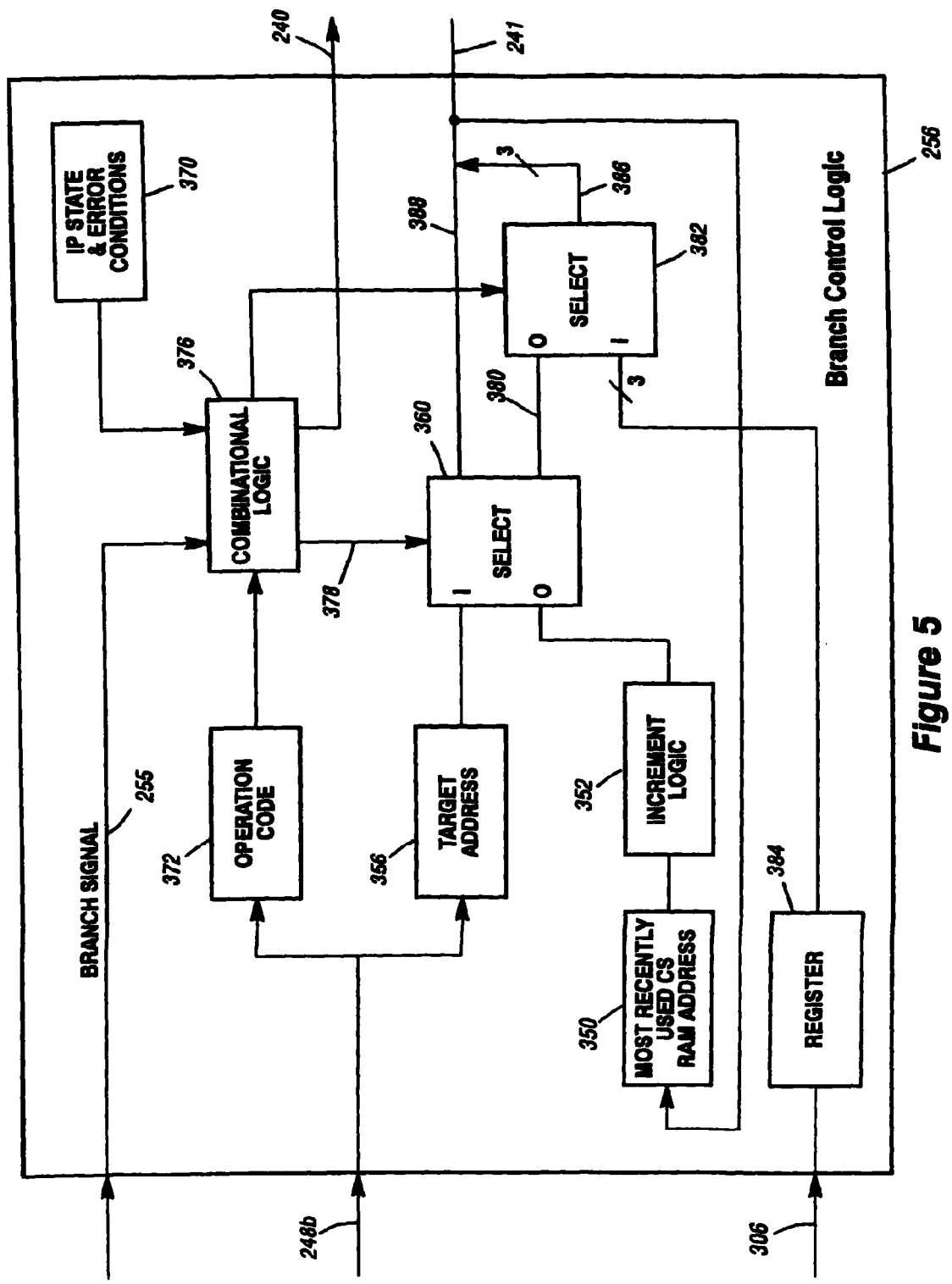
FIG. 5 is a schematic block diagram of branch control logic of one embodiment of the current invention.

FIG. 5 is a logic block diagram of branch control logic 256. This diagram illustrates an exemplary system for generating a next address for use in accessing CS microcode RAM 236. If it is determined that no branch conditions occurred during the current stage of instruction execution, the address most recently used to access CS microcode RAM 236 is incremented for use as the next address. Otherwise, if one or more predetermined branch conditions are detected, another target address is selected for accessing the RAM.

The RAM address most recently used to access CS microcode RAM is shown stored in register 350. This address is incremented by increment logic 352. Additionally, the target address, which may be used as the next address if one of the branch conditions occurs, is shown stored in register 356.

This target address is a subset of address and control signals on lines 248b that were read from CS microcode RAM 236 during the current instruction cycle.

Both target address and the incremented address generated by increment logic 352 are provided to select logic 360. Select logic 360 selects one of these addresses based on whether a predetermined one or more of the branch conditions occurred during the current instruction execution cycle. The possible branch conditions include any of the conditions detected by instruction branch logic 252 (FIG. 4) as indicated by the activation of branch signal 255. The branch conditions further include the IP state and/or error conditions represented by block 370. These state and/or error conditions may be generated by any logic section in the IP, and are provided as signal lines to branch control logic 256 for use in generating the next RAM address. Generally speaking, any signal activated during instruction execution may be provided to branch control logic for use in this manner.

The branch conditions, including branch signal 255, and state and error conditions in block 370, are provided to combinational logic 376 for processing. Combination logic 376 further receives operation code 372, which is a subset of address and control signals 248b read from CS microcode RAM during the current instruction cycle. This operation code is used by combinational logic 376 to select whether branch signal 255 and/or any of the other state and error conditions in block 370 will be employed to generate the next address to be presented to CS microcode RAM.

It may be noted that operation code 372 and the microcode test bits stored in register 274 (FIG. 4) work together to accomplish selection of the various branch conditions used to generate a next CS microcode RAM address. In one embodiment of the invention, the microcode test bits may be a subfield of operation code 372.

After the signal generated by combination logic 376 is used by select logic 360 to select an address, the least significant bits of the selected address are provided on line 380 to select logic 382. Select logic 382 further receives the set of address signals 306 that were generated by instruction branch logic 252. Recall that these signals are obtained from a selected one of the "J" and "A" instruction opcode fields, as discussed above in reference to FIG. 4. Combinational logic 376 generates a signal to select between these two sets of address signals. This selection is made based on operation code 372 in a manner similar to that discussed above in reference to select logic 360. The selected address bits on lines 386 are concatenated with the most significant address bits on lines 388 to provide a complete address 241. This address is then forwarded to select logic 238 (FIG. 3B) on lines 241 for possible use as the CS microcode RAM address.

Branch control logic further generates the select signal on line 240 to control whether the address on lines 241 or an address generated by instruction decode 164 will be selected for presentation to CS microcode RAM 236. This select signal is generated by combinational logic 376 based on operation code 372.

The invention described above provides the capability to define instructions after the hardware design is completed. The invention also allows some design flaws to be corrected within requiring a hardware modification. This is best described using the following example.

Assume a "Store" instruction that stores data to main memory is included within the instruction set of the IP. Several variations of the instruction are defined, including a first variation that stores an entire word to memory, and another variation that stores only a half-word. Each of the defined variations of the "Store" instruction are executed using the same microcode words stored with CS microcode RAM 236. Further assume that a design error is discovered that affects only one of the variations of the Store instruction. In prior art designs, correcting the design flaw by modifying the CS microcode RAM was very difficult, if not impossible, because the same microcode stored in CS microcode RAM 236 is executed for all variations of the instruction, including those "Store" instructions that do not require modification. As such, workarounds were implemented using interrupts to the operating system, as discussed above. Processing of interrupts is very time-consuming. This solution therefore degrades performance, particularly when a commonly used instruction is associated with a workaround.

The current invention addresses the foregoing problem by providing decode capability that can take advantage of the fact that instruction opcodes are not completely decoded for most instructions. To continue with the current example, assume that for the "Store" instruction, the hardware does not decode and use all possible bit combinations of the "J" field. As such, one of the unused "J" field bit combinations may be selected for use in identifying the "Store" instruction that is to be associated with a workaround. This "J" field combination may be identified using microcode test bits stored within CS microcode RAM 236 that are set to the desired "J" field bit combination using scan interface 237. These microcode test bits are provided to instruction branch logic 252 to be compared against the "J" field in the manner discussed above.

During execution of any "Store" instruction, the first address accessed within CS microcode RAM 236 will result in the comparison discussed above. Because the CS microcode RAM 236 data for the "Store" instruction has been modified to cause a favorable comparison to occur, a branch will be taken to the alternative target address where instructions are loaded to implement the workaround. If more than a two-way branch is needed, the alternative target address, can cause another "J" field comparison that results in branching to the ultimate destination so the execution of the workaround can begin. This type of multiple branching operation can be repeated as many times as needed to direct execution to the workaround location.

Although the above example discusses use of the "J" field to accomplish instruction branching, the current embodiment of the invention further allows use of the "A" field, or both the "J and A" fields, to initiate this branch operation. In another embodiment of the invention, a new variation of the "Store" instruction, or even another unrelated instruction, may be added to the instruction set of the IP by employing an unused instruction opcode in the manner discussed. In yet another embodiment of the invention, any other subset of the instruction opcode may be provided to instruction branch logic 252 and utilized in a similar manner to that described above in reference to the "J" and "A" fields.

The foregoing discussion focuses on comparisons between the test microcode bits and the "J" and "A" fields. This comparison results in a two-way branch using branch signal 255. The invention may also be used to initiate more than a two-way branch. This is accomplished by using a portion of the instruction opcode as the least significant bits of the target branch address. In the current embodiment, a sub-set of either the "J" or "A" fields may be selected by select logic 300 (FIG. 4) and driven as a set of address signals onto lines 306. These address signals may be merged by select logic 382 (FIG. 5) into the most significant target address to provide the least significant bits of that target address. In this manner, a subset of three "A" or "J" field bits may be used to provide an eight-way branch. Similarly, a set of four bits may be used to provide a sixteen-way branch, and so on. In still another embodiment, portions of the "A" or "J" fields not used to drive address lines 306 may be used to increase the branching capability. For example, an eight-way branch may first be initiated using the three least significant bits of the "A" or "J" fields. This causes execution to resume at a target address, where microcode bits may select use of the most significant "A" or "J" bit on line 288 or 286, respectively, to perform a two-way branch. In this manner, a sixteen-way branch on the full "A" or "J" field may be implemented where desired.

As discussed above, the "A" and "J" fields may be selected for use as the least significant address bits of the target address. The most significant bits of the target address may be selected based on the value of branch signal 255 using the logic of FIG. 5. For example, the "J" field could be used to generate branch signal 255, and the "A" field could be used as the least significant address bits to accomplish the multi-way branching.

The embodiment of the invention described in FIG. 3A through FIG. 5 discusses use of the instruction opcode by CS section 170 to further select a CS microcode RAM address to control instruction execution. A similar concept may be employed within arithmetic section 194 (FIG. 2), as is discussed in reference to FIGS. 6 and 7.

Figure 6:
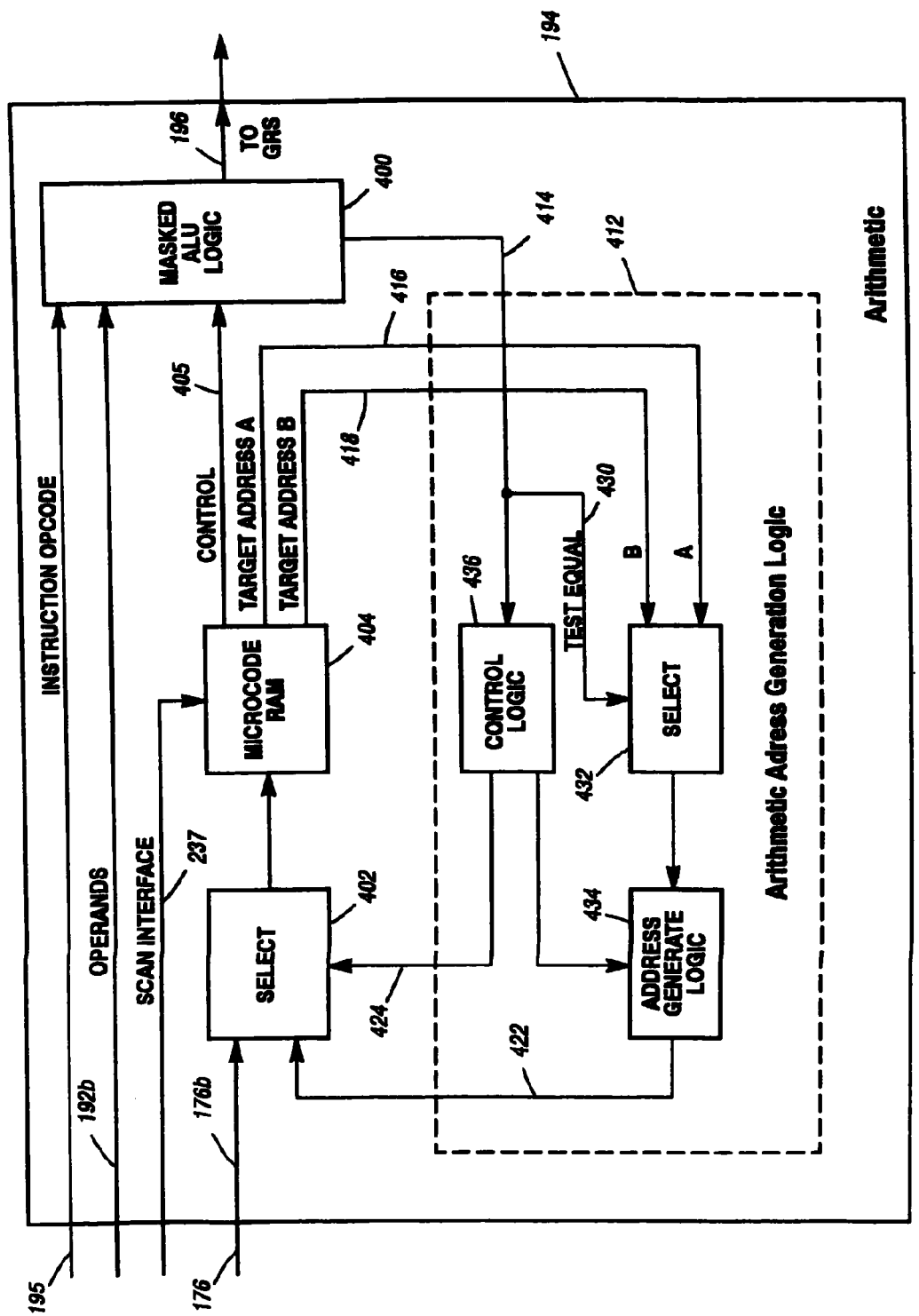
FIG. 6 is a logic block diagram of the arithmetic section.

FIG. 6 is a logic block diagram of the arithmetic section 194. The arithmetic section receives control signals 176 that are generated by either instruction decode 164 or CS section 170 as described above. A subset of control signals 176 is provided to select logic 402 to be used to address microcode RAM 404. Signals read from the RAM are provided on lines 405 to masked ALU logic 400. Masked ALU logic 400 further receives operands on lines 192b that are processed in a manner to be described below. Masked ALU performs a selected arithmetic operation under the control of signals on lines 405. The result of this arithmetic operation are forwarded on lines 196 to GRS 28a for storage.

In addition to the signals provided to masked ALU logic 400, microcode RAM 404 also provides multiple target addresses to arithmetic address generation logic 412 (shown dashed). These addresses are used to generate the next address that will be employed to address microcode RAM. These target addresses are shown as target addresses A 416 and B 418.

Arithmetic address generation logic 412 further receives condition bits on lines 414 from masked ALU logic 400. The condition bits, which describe the results of a current arithmetic operation performed by masked ALU logic 400, may include a "test equal", "test greater than", test less than", and other similar condition bits generated by ALU units in a manner known in the art. These bits are used by address generation logic 412 to determine which of target addresses A 416 and B 418 will be used to generate the next microcode address. This generated microcode address will be provided to select logic 402 on line 422, and will be selected by the signal on line 424, which is also generated by arithmetic address generation logic 412.

Arithmetic logic 194 according to the current invention further receives the instruction opcode on line 195 from F0 register 164a. This instruction opcode is provided to masked ALU logic 400, and may be used to generate a selected one or more of the condition bits on lines 414 in a manner to be discussed below.

In one embodiment of the invention, instruction opcode on line 195 is used by masked ALU logic 400 during certain instruction cycles to generate a "test equal" condition bit. Other bits such as those mentioned above may be used in the alternative. The "test equal" bit is provided on line 430 to select logic 432. The state of this bit is used to select between target addresses A 416 and B 418. The selected address is provided to address generate logic 434, where additional processing of the address occurs under the control of control logic 436. This additional processing, which occurs based on the state of condition bits on lines 414, is beyond the scope of the current invention and will not be discussed further.

Figure 7:
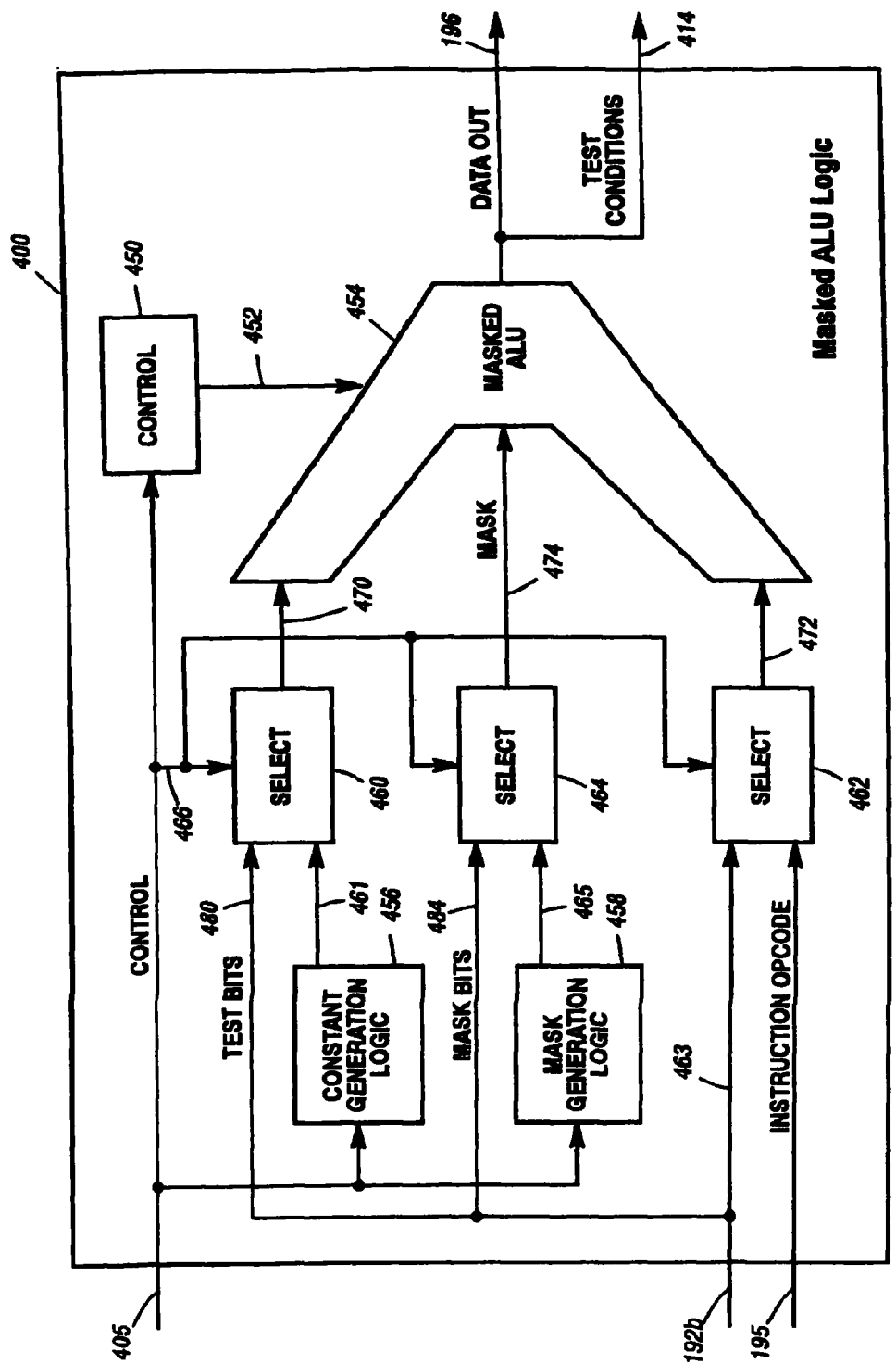
FIG. 7 is a block diagram of masked ALU logic.

FIG. 7 is a block diagram of masked ALU logic 400. Masked ALU logic 400 receives control signals on lines 405 which are read from microcode RAM 400 in the manner discussed above. These signals are provided to control logic 450, and are used to generate signals on lines 452 to control the operating mode of masked ALU 454.

In one embodiment of the invention, masked ALU 454 is an ALU similar to that described in commonly assigned U.S. Pat. No. 4,592,005 to Kregness issued May 27, 1986 incorporated herein by reference. This ALU, which has the capability to receive a mask operand to facilitate mask compares, performs various arithmetic operations based on the operating mode as determined by the signals on lines 452.

Masked ALU logic 400 further receives one or more operands on lines 192b from operand cache 28 (FIG. 2). Depending on the type of instruction being executed, operands may be provided on lines 480, 463, and 484 to select logic 460, 462, and/or 464 respectively. These operands may be selected for presentation to masked ALU 454 for use in performing the arithmetic operation.

During execution of other instructions, the operands and/or constants are not provided from the operand cache 28. Instead, the operands and/or constants are generated under the control of control signals provided on lines 405. For example, during execution of some instructions, control signals are provided to constant generation logic 456 to generate a constant that is forwarded to select logic 460. This constant is then selected by control signals on lines 466 for presentation to masked ALU 454. Similarly, during execution of other instructions, control signals are provided to mask generation logic 458. Mask generation logic generates a mask that is forwarded to select logic 464, and that is then gated to ALU 454.

As discussed above, the constants, operands, and/or mask data required for execution of a given instruction is either provided on lines 192b or is generated under the control of control bits on lines 405. Gating of this data is performed by select logic 460, 462, and 464 under the control of control signals 466 provided on lines 405. Thereafter, arithmetic processing occurs as directed by control signals on lines 452. Following execution of some instructions, a result of the arithmetic operation is provided on lines 196, and is written to GRS 28a. Test condition bits resulting from the arithmetic operation are provided on lines 414 for use in controlling address generation for microcode RAM 404 in the manner discussed above.

For the reasons described above, it may be desirable to add instructions to the instruction set of the instruction processor, and/or to modify execution of an existing instruction after the hardware design is completed. The embodiment of the invention discussed above in reference to FIGS. 4 and 5 provides a solution to this problem by allowing for the programmed decode of the instruction opcode within the Control Store section of an instruction processor. In another embodiment of the invention, these concepts may be applied to arithmetic section 194. In this alternative embodiment, the instruction opcode from the F0 register 164a is forwarded to masked ALU logic 400, which generates a signal that may be used to control generation of a microcode address. In this manner, masked ALU logic 400 may be employed as an instruction branch circuit that is similar to instruction branch logic 252 of FIG. 4. This is described in detail as follows.

The instruction opcode from register F0 164a is provided to select logic 462 on lines 195. In addition, operands on lines 192b are provided from the operand cache 28 to select logic 460 and select logic 464. These operands may be referred to as test bits on lines 480 and mask bits on lines 484. The instruction opcode, and the test and mask bits are then selected by select logic 462, 460, and 464, respectively, for presentation to masked ALU 454. Masked ALU 454, operating under the control of control signals 452, uses these data signals to perform a masked compare operation. During this compare operation, the instruction opcode on lines 472 is masked using mask bits gated on lines 474. As is known in the art, this mask operation results in retaining only those bits of the instruction opcode that correspond with those mask bits that are "set". The masked instruction opcode is then compared to test bits that have been gated onto lines 470. This compare operation determines whether the two bit patterns are the same. If so, the "test equal" signal, which is one of the test conditions 414, is activated on line 430 (FIG. 6).

The "test equal" signal is provided to arithmetic address generation logic 412 to select between target addresses A 416 or B 418 in the manner discussed above. An activated "test equal" signal can be used to divert execution within microcode RAM 404 to code that implements a workaround or a new instruction in a manner similar to that discussed above with respect to CS section 170.

As will be appreciated from the foregoing discussion, the logic of the ALU allows any one or more fields and/or subfields of the instruction opcode to be selected via mask bits 484 for use in the masked compare operation. Additionally, the masked instruction opcode may be compared against any possible bit combination as provided by test bits 480. This provides a very flexible approach to processing the instruction opcode. Moreover, this processing may be performed using existing logic, including the masked ALU 454 and most other control logic. The instruction opcode is used in the same manner as any other operand would be used during a masked compare operation. The mask and test bits may be provided as selectable operands to the instruction.

Processing of the instruction opcode according to the current invention is triggered when the addressed word of microcode RAM 404 includes control signals provided on lines 405 to control selection of test bits 480, mask bits 484, and the instruction opcode. Another subset of these control signals causes masked ALU to perform the masked operand compare. These bits, along with one or more of the target addresses A 416 and B 418, may be modified within microcode RAM 404 using scan interface 237, as is known in the art. Additional microcode instructions may be stored within microcode RAM 404 at one of the target addresses to implement a new or modified instruction. This allows for the modification of the instruction set of the processor so that new instructions may be added, and execution of existing instructions may be changed. These new instructions execute at speeds that are comparable to existing instruction implemented within the hardware instruction set.

It will be appreciated that the embodiments described above are exemplary, and other embodiments are possible within the scope of the current invention. For example, the test and mask bits used during the masked compare of the instruction opcode may be generated by constant generation logic 456 and mask generation logic 458, respectively, under the control of control signals on lines 405, instead of being provided as operands. In yet another embodiment, the test and mask bits could be provided directly from microcode RAM 404 to select logic 460 and 464, respectively, or from yet another storage device in the instruction processor. If desired, one or more bits of the instruction opcode could be selected for use as address bits in a manner similar to that described above in reference to FIGS. 4 and 5. In still another embodiment, multiple storage devices could be employed within the instruction processor to provide any of the test bits, mask bits, and/or control signals. Additionally, the address that is generated using the test and mask bits may be used to address a different storage device than any of the storage devices that were employed during address generation.

Figure 8:
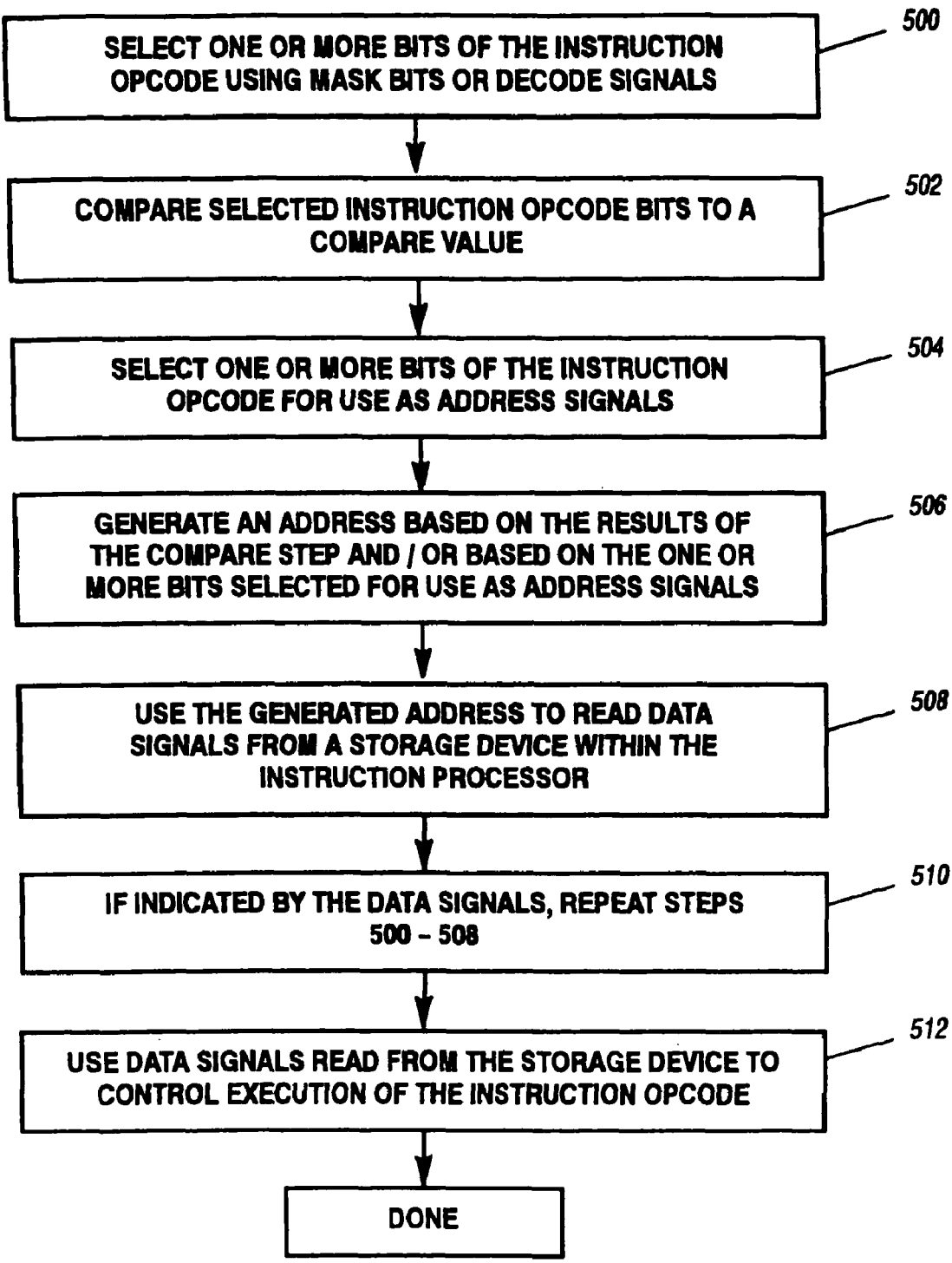
FIG. 8 is a flow diagram of a process of controlling instruction execution according to the current invention.

FIG. 8 is a flow diagram illustrating a process of controlling instruction execution according to the current invention. First, one or more bits of the instruction opcode are selected (500). This may be accomplished using mask bits as shown in FIG. 7, or using decode signals, as shown in FIG. 4. If mask bits are utilized, these bits could be provided as an instruction operand, as data signals read from a storage device such as a microcode RAM, or as signals generated by logic within the instruction processor.

Next, the selected instruction opcode bits are compared against a compare value (502). The compare value may be provided as an instruction operand, as data signals read from a storage device, or as signals generated by logic within the instruction processor.

The same set, or a different set, of one or more instruction opcode bits may be selected for use as address bits (504). Using these selected address bits and/or the result of the compare step 502, an address is generated for use in addressing a storage device within the instruction processor (506). This storage device may be a microcode RAM, for example. This address is employed to read data signals from the storage device (508). These data signals may be microcode bits read from the microcode RAM. If indicated by the data signals read in step 508, steps 500 through 508 may be repeated (510). Otherwise, the data signals are used to control execution of the instruction that is indicated by the instruction opcode (512).

It will be understood that the above-described method is exemplary. For example, either, or both, of steps 502 and 504 may be performed. Additionally, in many cases, the ordering of the steps is largely arbitrary. Thus, the embodiments of the invention herein described are merely illustrative of the principles of the invention, and are not intended to limit the scope of the claims, which themselves recite those features regarded as essential to the invention.

What is claimed is:

1. A method of controlling execution of an instruction processor, comprising:
    providing a storage device within the instruction processor having contents which are used to control execution of the instruction processor;
    selecting an instruction opcode that is unused by:
        a) selecting one or more bits of the instruction opcode that are not fully decoded such that the bits may assume one or more encoded values that are not used to control execution of the instruction processor; and
        b) comparing the selected bits to a selectable compare value that is set to one of the one or more encoded values, wherein the selected bits are not sent to a decoder and are used for comparison purposes only in steps a.) and b.); and
    generating, based on a matching result of the comparing step, a branch address to branch to a new location within the storage device to access different contents to control execution of the instruction processor.

2. The method of claim 1, wherein step a) includes utilizing a mask to select the one or more bits of the instruction opcode.

3. The method of claim 2, wherein the mask is read from a memory device within the instruction processor.

4. The method of claim 3, wherein the mask is read from the storage device.

5. The method of claim 2, wherein the mask is an operand of the instruction opcode.

6. The method of claim 2, wherein step a) includes generating the mask.

7. The method of claim 1, wherein step a) includes generating decode signals to select one or more bits of the instruction opcode.

8. The method of claim 7, wherein step a) includes using signals stored within the storage device to generate the decode signals.

9. The method of claim 1, wherein step b) includes reading the compare value from the storage device.

10. The method of claim 1, wherein the compare value is an operand of the instruction opcode.

11. The method of claim 1, wherein at least one of steps a) and b) are performed by an Arithmetic Logic Unit (ALU).

12. The method of claim 11, wherein the ALU is controlled by signals read from the storage device.

13. The method of claim 11, wherein the ALU provides a branch condition for use in generating the address.

14. The method of claim 13, wherein the generating step includes using the branch condition to select between two target addresses, the selected address being used to address the storage device.

15. The method of claim 1, wherein the storage device is a microcode RAM.

16. The method of claim 15, wherein the microcode RAM controls a control store section of the instruction processor.

17. The method of claim 15, wherein the microcode RAM controls an arithmetic section of the instruction processor.

18. The method of claim 1, and further including using the address generated in the generating step to read signals used to control execution of the instruction processor.

19. The method of claim 18, wherein the instruction processor includes a micro sequencer, and further including causing the micro sequencer to begin execution of a microcode instruction stored at the address.

20. The method of claim 1, and further including the steps of using selected bits of an operand of the instruction opcode as address bits in the generating step.

21. The method of claim 20, wherein the ones of the selected bits are used as least significant address bits of the address.

22. The method of claim 1, and further including repeating all steps to generate a second address for use in addressing the storage device.

23. The method of claim 1, and further including, prior to step a), storing microcode instructions at the address for use in controlling execution of the instruction opcode.

24. A method of controlling execution of an instruction processor,
comprising:
a) reading data signals from a storage device of the instruction processor;
b) in an instruction opcode that is unused, selecting one or more bits of the instruction opcode that are set to a programmably-selected value that is not used to initiate any execution;
c) employing the data signals and the selected bits of the instruction opcode to obtain a microcode instruction, wherein the selected bits are not sent to a decoder and are used for comparison purposes only in steps b) and c); and
d) using the microcode instruction to control operation of the instruction processor.

25. The method of claim 24, wherein the data signals and the selected bits are used to obtain an address for retrieving the microcode instruction.

26. The method of claim 25, wherein the data signals include mask bits for use in selecting the one or more bits of the instruction opcode.

27. The method of claim 25, wherein step b) includes decoding the data signals to select the one or more bits of the instruction opcode.

28. The method of claim 25, wherein the data signals include a compare value, and wherein step c) includes comparing the selected bits to the compare value.

29. The method of claim 28, and further including using the result of the comparison to select one of multiple addresses for use as the address to retrieve the microcode instruction.

30. The method of claim 25, wherein the address is used to address a microcode RAM.

31. The method of claim 24, wherein at least one of steps b) and c) are performed by an Arithmetic Logic Unit (ALU).

32. The method of claim 31, wherein ones of the data signals are used to control the ALU.

33. The method of claim 25, wherein at least one of steps b) and c) employs one or more instruction operands.

34. The method of claim 33, wherein one of the operands is a compare value to be compared against the selected bits.

35. The method of claim 34, wherein one of the operands is a mask for use in selecting the selected bits.

36. The method of claim 25, wherein ones of the selected bits are used as bits of the address.

37. A system for use in controlling the operation of an instruction processor, comprising:
a storage device; and
an instruction branch circuit coupled to receive data signals from the storage device, the instruction branch circuit further to receive an instruction opcode that is not used in controlling the operation of the instruction processor, the instruction opcode including one or more bits that are not fully decoded such that the bits may be set to an encoded value that was not used to control execution, and to use the data signals and the one or more bits of the instruction opcode without any decoding of the one or more bits of the instruction opcode and by only comparing the one or more bits of the instruction opcode to retrieve a microcode instruction if the one or more bits are set to the encoded value, whereby the microcode instruction is used to control execution of newly-added functionality for the instruction processor.

38. The system of claim 37, wherein the instruction branch circuit includes a circuit that uses the data signals and the one or more bits of the instruction opcode to obtain an address for retrieving the microcode instruction.

39. The system of claim 38, and further including a circuit coupled to the instruction branch circuit to provide the address to the storage device to retrieve the microcode instruction.

40. The system of claim 39, wherein the data signals are included within a microcode instruction stored within the storage device.

41. The system of claim 38, wherein the instruction branch circuit includes a select circuit to select one of multiple addresses for use as the address to retrieve the microcode instruction.

42. The system of claim 41, wherein at least one of the multiple addresses is provided by the storage device as ones of the data signals.

43. The system of claim 41, wherein the instruction branch circuit includes a compare circuit to compare ones of the one or more bits of the instruction opcode to a compare value, and to select the one of multiple addresses based on the comparison.

44. The system of claim 43, wherein the compare circuit receives an operand for use as the compare value.

45. The system of claim 42, wherein the compare value is provided by the storage device as ones of the data signals.

46. The system of claim 38, wherein ones of the one or more bits of the instruction opcode are used as address bits of the address.

47. The system of claim 37, wherein the instruction branch circuit includes a circuit to select the one or more bits of the instruction opcode.

48. The system of claim 47, wherein the circuit to select the one or more bits of the instruction opcode includes a decoder circuit to decode one or more of the data signals.

49. The system of claim 47, wherein the circuit to select the one or more bits of the instruction opcode includes a circuit that performs a mask operation on the instruction opcode.

50. The system of claim 49, wherein the circuit to select the one or more bits of the instruction opcode receives an instruction operand for use as a mask for performing the mask operation.

51. The system of claim 47, wherein the circuit to select the one or more bits of the instruction opcode includes an Arithmetic Logic Unit (ALU).

52. The system of claim 51, wherein the ALU is a masked ALU.

53. The system of claim 37, wherein the storage device is a control store microcode RAM to store control signals to control operation of multiple logic sections within the instruction processor.

54. The system of claim 37, wherein the storage device is a microcode RAM to store control signals to control execution of arithmetic operations within the instruction processor.

55. A system for use in controlling execution of an instruction processor, comprising:

storage means for storing control signals to control logic within the instruction processor;

decode means for decoding instruction opcodes for generating decode signals to control execution of the instruction processor; and branch means for receiving an unused instruction opcode, and for modifying execution of the instruction processor if one or more bits of the unused instruction opcode have been set to a value that is not used to control execution of the instruction processor as determined by the control signals, wherein the one or more bits of the unused instruction opcode are selected by the branch means and are not sent to a decoder, the branch means using the selected bits for comparison purposes only.

* * * * *